United States Patent
Yoon

(10) Patent No.: US 12,125,218 B2
(45) Date of Patent: Oct. 22, 2024

(54) OBJECT TRACKING APPARATUS AND METHOD

(71) Applicants: Hyundai Motor Company, Seoul (KR); Kia Corporation, Seoul (KR)

(72) Inventor: Young Chul Yoon, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 380 days.

(21) Appl. No.: 17/694,029

(22) Filed: Mar. 14, 2022

(65) Prior Publication Data
US 2023/0069608 A1   Mar. 2, 2023

(30) Foreign Application Priority Data
Aug. 26, 2021  (KR) .......................... 10-2021-0113330

(51) Int. Cl.
*G06T 7/246* (2017.01)
*G06T 3/40* (2024.01)
*G06T 7/73* (2017.01)

(52) U.S. Cl.
CPC ............... *G06T 7/248* (2017.01); *G06T 3/40* (2013.01); *G06T 7/74* (2017.01); *G06T 2207/10024* (2013.01); *G06T 2207/20081* (2013.01)

(58) Field of Classification Search
CPC . G06T 2207/10024; G06T 2207/20081; G06T 2207/20084; G06T 3/40; G06T 7/246; G06T 7/248; G06T 7/74
See application file for complete search history.

(56) References Cited

U.S. PATENT DOCUMENTS

| | | | |
|---|---|---|---|
| 8,269,848 B2 | 9/2012 | Kakinami | |
| 9,734,399 B2 | 8/2017 | Flores et al. | |
| 10,002,435 B2* | 6/2018 | Hong | ........................ G06T 7/74 |
| 10,489,708 B2 | 11/2019 | DeTone et al. | |
| 10,902,641 B2 | 1/2021 | Hafner et al. | |
| 11,062,209 B2 | 7/2021 | DeTone et al. | |
| 2002/0167537 A1* | 11/2002 | Trajkovic | ................ G06T 7/207 |
| | | | 345/649 |

(Continued)

FOREIGN PATENT DOCUMENTS

| EP | 3531376 A1 | 8/2019 |
|---|---|---|
| KR | 100526018 B1 | 10/2005 |

(Continued)

OTHER PUBLICATIONS

Simone Calderara et al., "Detecting anomalies in people's trajectories using spectral graph analysis," Mar. 31, 2011, Computer Vision and Image Understanding 115 (2011), pp. 1099-1110.*

(Continued)

*Primary Examiner* — Omar S Ismail
(74) *Attorney, Agent, or Firm* — Slater Matsil, LLP

(57) ABSTRACT

An embodiment object tracking method includes receiving a first image at time t from a camera, deriving a homography matrix based on the first image and a second image at time t−1, correcting a position of a first object detected from the second image using the homography matrix, detecting a second object matched with the first object from the first image, and tracking a change in position of the second object based on the corrected position of the first object.

20 Claims, 13 Drawing Sheets

(56) References Cited

U.S. PATENT DOCUMENTS

| | | | |
|---|---|---|---|
| 2008/0031514 A1 | 2/2008 | Kakinami | |
| 2011/0164789 A1* | 7/2011 | Robert | G06V 10/44 382/104 |
| 2012/0327220 A1* | 12/2012 | Ma | G06T 7/292 348/135 |
| 2014/0098229 A1* | 4/2014 | Lu | G06T 7/80 348/148 |
| 2014/0195138 A1* | 7/2014 | Stelzig | G08G 1/0116 701/119 |
| 2014/0241576 A1* | 8/2014 | Yu | G06T 7/55 382/103 |
| 2017/0337470 A1 | 11/2017 | DeTone et al. | |
| 2018/0075593 A1* | 3/2018 | Wang | G06V 40/103 |
| 2019/0259178 A1 | 8/2019 | Hafner et al. | |
| 2019/0325230 A1* | 10/2019 | Nadler | G06T 19/20 |
| 2020/0097819 A1 | 3/2020 | DeTone et al. | |
| 2020/0387716 A1* | 12/2020 | Nadler | G06V 40/16 |
| 2021/0264141 A1* | 8/2021 | Chojnacki | G06V 40/25 |
| 2021/0314531 A1* | 10/2021 | Jo | G06V 20/52 |

FOREIGN PATENT DOCUMENTS

| | | |
|---|---|---|
| KR | 100869570 B1 | 11/2008 |
| KR | 20120048958 A | 5/2012 |
| KR | 101204870 B1 | 11/2012 |
| KR | 101460517 B1 | 11/2014 |
| KR | 101480824 B1 | 1/2015 |
| KR | 20150002273 A | 1/2015 |
| KR | 20210019609 A | 2/2021 |

OTHER PUBLICATIONS

Jian Chen,"Adaptive Homography-Based Visual Servo Tracking for a Fixed Camera Configuration With a Camera-in-Hand Extension," Apr. 8, 2005, IEEE Transactions on Control Systems Technology, vol. 13, No. 5, Sep. 2005, pp. 814-820.*

Jirong Zhang et al.,"Content-Aware Unsupervised Deep Homography Estimation," Nov. 3, 2020, Computer Vision—ECCV 2020: 16th European Conference, Glasgow, UK, Aug. 23-28, 2020, Proceedings, Part I 16. Springer International Publishing, 2020. pp. 653-663.*

Noor Al-Shakarji et al.,"Multi-Cue Vehicle Detection for Semantic Video Compression in Georegistered Aerial Videos," Jun. 2019, Proceedings of the IEEE/CVF Conference on Computer Vision and Pattern Recognition (CVPR) Workshops, 2019, pp. 1-8.*

Jin Tang et al.,"RGBT Salient Object Detection: Benchmark and A Novel Cooperative Ranking Approach," Nov. 5, 2019, IEEE Transactions on Circuits and Systems for Video Technology, vol. 30, No. 12, Dec. 2020, pp. 4421-4427.*

Andrej Zdear et al.,"Visual Trajectory-Tracking Model-Based Control for Mobile Robots," Jun. 12, 2013, International Journal of Advanced Robotic Systems, pp. 1-10.*

Graham Finlayson,"Color Homography: Theory and Applications," Dec. 12, 2018, IEEE Transactions on Pattern Analysis and Machine Intelligence, vol. 41, No. 1, Jan. 2019, pp. 20-31.*

Yoon, J., et al., "Bayesian Multi-Object Tracking Using Motion Context from Multiple Objects", IEEE Winter Conference on Applications of Computer Vision, Jan. 5-9, 2015, Waikoloa, HI, USA, 8 pages.

Yoon, J., et al., "Online Multi-Object Tracking via Structural Constraint Event Aggregation", IEEE Conference on Computer Vision and Pattern Recognition (CVPR), Jun. 27-20, 2016, Las Vegas, NV, USA, 9 pages.

Zhang, J., et al., "Content-Aware Unsupervised Deep Homography Estimation", Computer Vision—ECCV 2020, Lecture Notes in Computer Science, vol. 12346, Nov. 3, 2020, total 18 pages.

* cited by examiner

OBJECT TRACKING APPARATUS AND METHOD

CROSS-REFERENCE TO RELATED APPLICATIONS

This application claims the benefit of Korean Patent Application No. 10-2021-0113330, filed on Aug. 26, 2021, which application is hereby incorporated herein by reference.

TECHNICAL FIELD

The present disclosure relates to an object tracking apparatus and a method thereof.

BACKGROUND

Homography is a conversion relationship between projected corresponding points, when projecting one plane onto another plane. Homography is mainly used to change and correct an image. Schemes of obtaining homography are a feature point matching scheme, a deep learning scheme, and the like. Such schemes exclude or does not consider a dynamic object region when obtaining the homography. Furthermore, because of needing to know ground truth homography between two images, the deep learning scheme has a limitation in which it is difficult to generate a dataset.

SUMMARY

Embodiments of the present disclosure can solve problems occurring in the prior art while advantages achieved by the prior art are maintained intact.

An embodiment of the present disclosure provides an object tracking apparatus for offsetting camera motion using only a red, green, blue (RGB) image to correct a position of an object and an object tracking method thereof.

The technical problems to be solved by embodiments of the present disclosure are not limited to the aforementioned problems, and any other technical problems not mentioned herein will be clearly understood from the following description by those skilled in the art to which the present disclosure pertains.

According to an embodiment of the present disclosure, an object tracking method may include receiving a first image at time t from a camera, deriving a homography matrix based on the first image and a second image at time t−1, correcting a position of a first object detected from the second image using the homography matrix, detecting a second object matched with the first object from the first image, and tracking a change in position of the second object based on the corrected position of the first object.

The deriving of the homography matrix may include deriving the homography matrix using a first homography derivation scheme or a second homography derivation scheme.

The deriving of the homography matrix may include deriving a first homography matrix and a second homography matrix using a first homography derivation scheme and a second homography derivation scheme and selecting a homography matrix with a higher target detection matching rate between the first homography matrix and the second homography matrix.

The first homography derivation scheme may be a method for deriving the homography matrix based on matching of a feature point of a static object except for a feature point of a dynamic object.

The second homography derivation scheme may be a method for deriving the homography matrix using a homography derivation network based on unsupervised learning.

The deriving of the homography matrix may further include verifying the homography matrix based on a predetermined verification condition.

The verifying of the homography matrix may include determining that verification passes when the homography matrix $$H = \begin{bmatrix} h_1 & h_2 & h_3 \\ h_4 & h_5 & h_6 \\ h_7 & h_8 & h_9 \end{bmatrix}$$

does not meet the predetermined verification condition, and determining that the verification does not pass when the homography matrix $$H = \begin{bmatrix} h_1 & h_2 & h_3 \\ h_4 & h_5 & h_6 \\ h_7 & h_8 & h_9 \end{bmatrix}$$

meets the predetermined verification condition.

The object tracking method may further include learning a homography derivation network based on images sampled in a situation where a camera is moving and initial learning data.

The receiving of the first image may include scaling the first image at a predetermined magnification.

The deriving of the homography matrix may include deriving the homography matrix with regard to the scaling.

According to another embodiment of the present disclosure, an object tracking apparatus may include a camera and a processor connected with the camera. The processor may receive a first image at time t from the camera, may derive a homography matrix based on the first image and a second image at time t−1, may correct a position of a first object detected from the second image using the homography matrix, may detect a second object matched with the first object from the first image, and may track a change in position of the second object based on the corrected position of the first object.

The processor may derive the homography matrix using a first homography derivation scheme or a second homography derivation scheme.

The processor may derive a first homography matrix and a second homography matrix using a first homography derivation scheme and a second homography derivation scheme and may select a homography matrix with a higher target detection matching rate between the first homography matrix and the second homography matrix.

The first homography derivation scheme may be a method for deriving the homography matrix based on matching of a feature point of a static object except for a feature point of a dynamic object.

The second homography derivation scheme may be a method for deriving the homography matrix using a homography derivation network based on unsupervised learning.

The processor may verify the homography matrix based on a predetermined verification condition.

The processor may determine that verification passes when the homography matrix $$H = \begin{bmatrix} h_1 & h_2 & h_3 \\ h_4 & h_5 & h_6 \\ h_7 & h_8 & h_9 \end{bmatrix}$$

does not meet the predetermined verification condition, and may determine that the verification does not pass when the homography matrix $$H = \begin{bmatrix} h_1 & h_2 & h_3 \\ h_4 & h_5 & h_6 \\ h_7 & h_8 & h_9 \end{bmatrix}$$

meets the predetermined verification condition.

The processor may learn a homography derivation network based on images sampled in a situation where the camera is moving and initial learning data.

The processor may scale an image obtained by the camera at a predetermined magnification.

The processor may derive the homography matrix with regard to the scaling.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
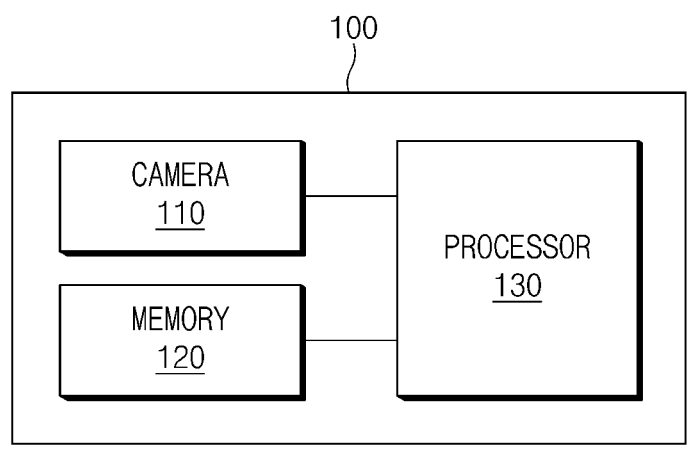
FIG. 1 is a block diagram illustrating a configuration of an object tracking apparatus according to embodiments of the present disclosure.

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be omitted in order not to unnecessarily obscure the gist of the present disclosure.

In describing the components of the embodiments according to the present disclosure, terms such as first, second, "A", "B", (a), (b), and the like may be used. These terms are merely intended to distinguish one component from another component, and the terms do not limit the nature, sequence or order of the constituent components. Furthermore, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Embodiments of the present disclosure may propose a technology of correcting an object position using a homography derivation scheme based on feature point matching or a homography derivation scheme based on deep learning of unsupervised learning to enhance tracking performance and offsetting camera motion in motion of an object to accurately model object motion.

FIG. 1 is a block diagram illustrating a configuration of an object tracking apparatus according to embodiments of the present disclosure.

An object tracking apparatus 100 may be a computing device capable of performing calculation. For example, the object tracking apparatus 100 may be loaded into a smartphone, a robot, a vehicle, a mobility device, and/or the like.

Referring to FIG. 1, the object tracking apparatus 100 may include a camera no, a memory 120, and a processor 130.

The camera 110 may capture an image. Herein, the image may refer to one frame of a video image. The camera 110 may be a red, green, blue (RGB) camera, which may obtain color information. The camera 110 may obtain an RGB image. Motion of the camera 110 may occur due to movement such as linear movement and/or rotation of the object tracking apparatus 100. Furthermore, motion of the camera 110 may occur due to a separate driving device.

The camera 110 may include at least one of image sensors such as a charge coupled device (CCD) image sensor, a complementary metal oxide semiconductor (CMOS) image sensor, a charge priming device (CPD) image sensor, and/or a charge injection device (CID) image sensor. The camera 110 may include an image processor for performing image processing, such as noise cancellation, color reproduction, file compression, image quality adjustment, and saturation adjustment, for an image obtained (acquired) by the image sensor.

The memory 120 may store a homography extraction algorithm based on feature point matching, a homography extraction algorithm based on deep learning, an object tracking algorithm, and/or the like. The memory 120 may store learning data, an unsupervised learning algorithm, and the like. The memory 120 may be a non-transitory storage medium which stores instructions executed by the processor 130. The memory 120 may include at least one of storage media such as a flash memory, a hard disk, a solid state disk (SSD), a secure digital (SD) card, a random access memory (RAM), a static RAM (SRAM), a read only memory (ROM), a programmable ROM (PROM), an electrically erasable and programmable ROM (EEPROM), an erasable and programmable ROM (EPROM), an embedded multimedia card (eMMC) and/or a universal flash storage (UFS).

The processor 130 may control the overall operation of the object tracking apparatus 100. The processor 130 may include at least one of processing devices such as an application specific integrated circuit (ASIC), a digital signal processor (DSP), programmable logic devices (PLDs), field programmable gate arrays (FPGAs), a central processing unit (CPU), microcontrollers, and/or microprocessors.

The processor 130 may obtain an image using the camera 110. The camera no may obtain and transmit an RGB image to the processor 130. The processor 130 may scale an original image input (received) from the camera no at a predetermined magnification.

The processor 130 may calculate homography (or a homography matrix) using images, for example, a current image and a previous image, which are obtained by the camera 110. Herein, it is assumed that each image is a scaled image. The processor 130 may calculate a homography matrix H using at least one of a homography derivation scheme based on feature point matching and/or a homography derivation scheme based on deep learning. As an example, the processor 130 may calculate a homography matrix from a current image and a previous image using the homography derivation scheme which is previously selected by a user.

As another example, the processor 130 may calculate each of a first homography matrix and a second homography matrix using the homography derivation scheme based on the feature point matching and the homography derivation based on the deep learning. Thereafter, the processor 130 may pass through a homography verification process to select a homography matrix with a higher target detection matching rate between the first homography matrix and the second homography matrix.

The processor 130 may verify the calculated homography based on a predetermined verification condition. When the homography matrix $$H = \begin{bmatrix} h_1 & h_2 & h_3 \\ h_4 & h_5 & h_6 \\ h_7 & h_8 & h_9 \end{bmatrix}$$

corresponds to at least one of predetermined verification conditions, the processor 130 may determine that the homography matrix $$H = \begin{bmatrix} h_1 & h_2 & h_3 \\ h_4 & h_5 & h_6 \\ h_7 & h_8 & h_9 \end{bmatrix}$$

does not pass verification (that the homography matrix $$H = \begin{bmatrix} h_1 & h_2 & h_3 \\ h_4 & h_5 & h_6 \\ h_7 & h_8 & h_9 \end{bmatrix}$$

fails in the verification). When the homography matrix H does not correspond to one of the predetermined verification conditions, the processor 130 may determine that the homography matrix H passes the verification (that the homography matrix H succeeds in the verification).

The verification conditions may include:

$$\sqrt{h_1^2 + h_4^2} > \tau_{xmax} \quad \quad 1)$$

$$\sqrt{h_2^2 + h_5^2} > \tau_{ymax} \quad \quad 2)$$

$$\sqrt{h_1^2 + h_4^2} \leq \tau_{xmin} \quad \quad 3)$$

$$\sqrt{h_2^2 + h_5^2} \leq \tau_{ymin} \quad \quad 4)$$

$$h_1 h_5 - h_2 h_4 \leq 0 \quad \quad 5)$$

$$\sqrt{h_7^2 + h_8^2} > \tau_{pers} \quad \quad 6)$$

Herein, $\tau_{xmin}$ and $\tau_{xmax}$ denote the minimum and maximum limits for x scaling of the homography matrix, $\tau_{ymax}$ and $\tau_{ymax}$ denote the minimum and maximum limits for y scaling of the homography matrix, and $\tau_{pers}$ denotes the limit for perspective change in homography. For example, it may be preset that $\tau_{xmin}=0.5$, $\tau_{xmax}=2.0$, $\tau_{ymin}=0.5$, $\tau_{xmax}=2.0$, and $\tau_{pers}=0.02$.

The processor 130 may correct state information (e.g., a position and/or a size) of an object in the image by applying the homography matrix H passing through the homography verification. The state information may include center coordinates (x, y), a width (w), a height (h), and the like of a bounding box (bbox) of the object. Only when there is an object being tracked in the image, the processor 130 may proceed with state correction of the object being tracked.

The processor 130 may detect and track an object from the image using an object tracking algorithm. The processor 130 may use at least one of object tracking algorithms such as a Kalman filter, a linear motion model, an extended Kalman filter, a simple intersection over union (IoU) tracker, and/or a particle filter.

The processor 130 may detect (search for) an object matched with the object being tracked in the image. The processor 130 may track a position change (i.e., movement) in the detected object on the basis of the corrected position of the object being tracked.

The processor 130 may transmit the result of tracking the object to an external system using a communication device (not shown). The external system may provide a predetermined specific service using the result of tracking the object.

Figure 2A:
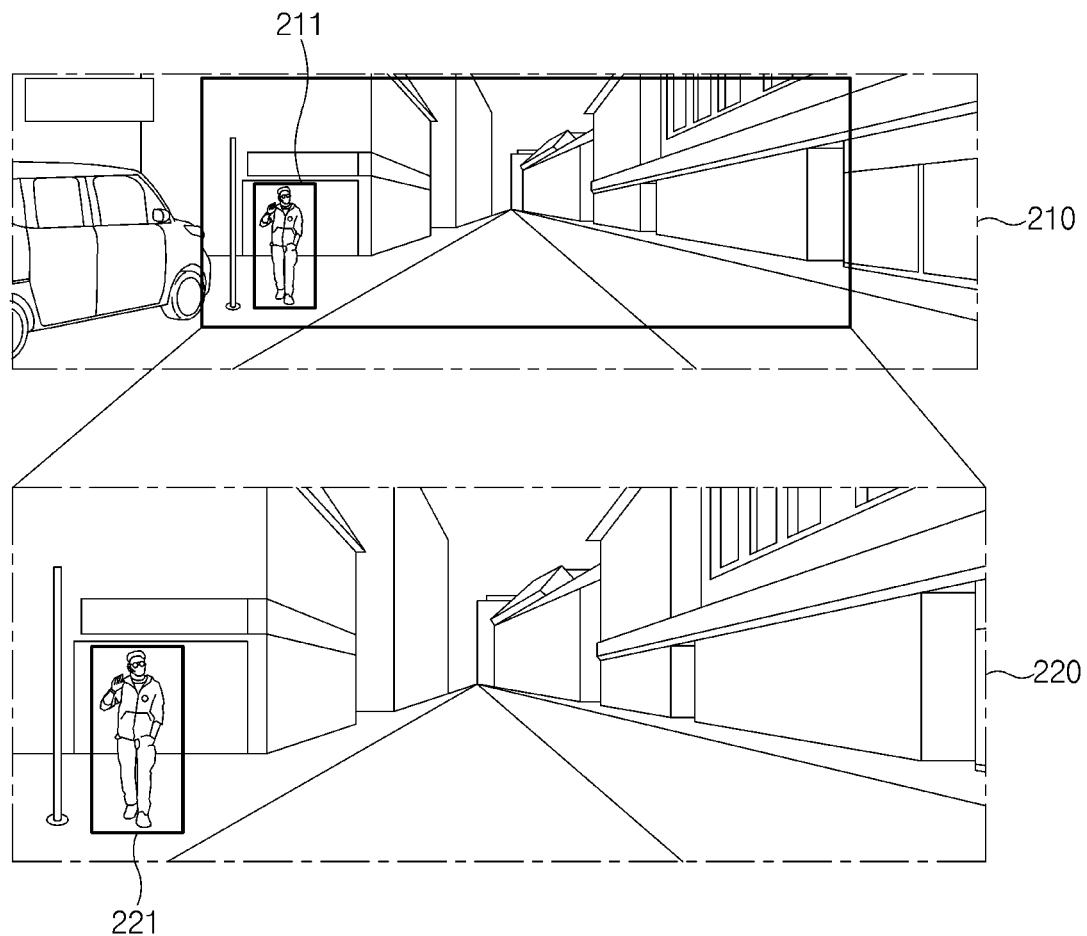
FIG. 2A is a drawing illustrating object position distortion according to camera motion according to embodiments of the present disclosure.
Figure 2B:
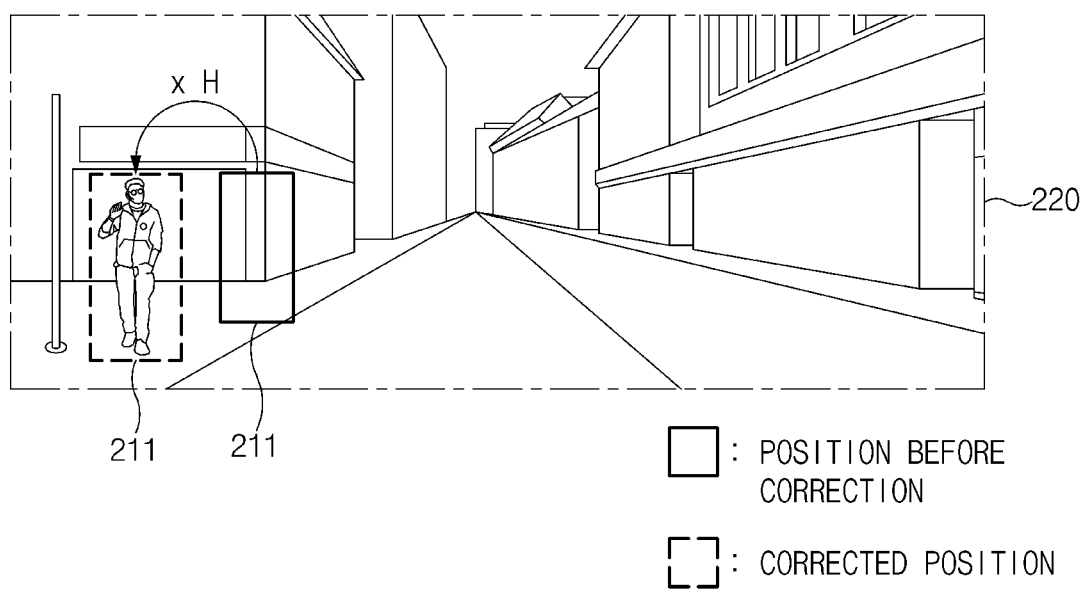
FIG. 2B is a drawing illustrating object position correction according to embodiments of the present disclosure.
Figure 2C:
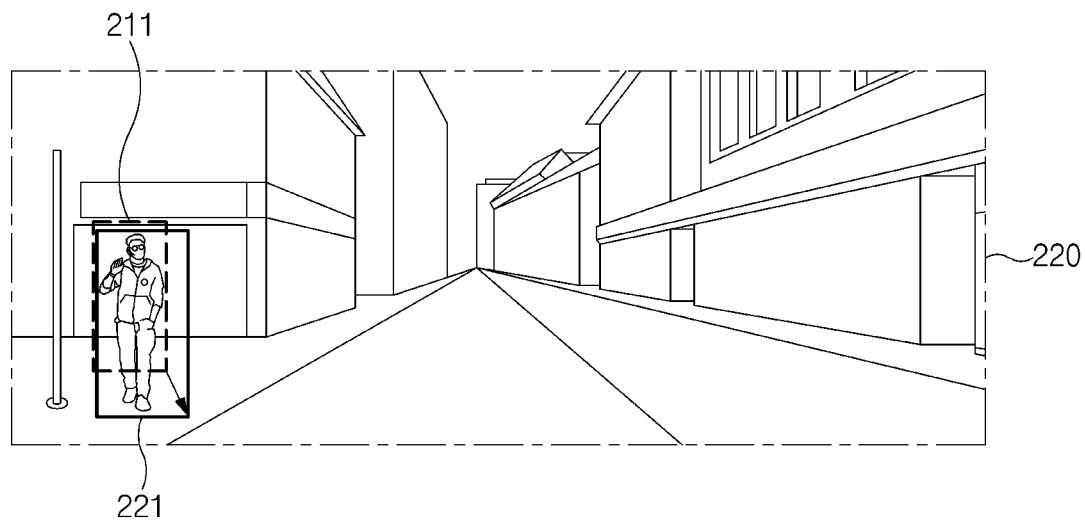
FIG. 2C is a drawing illustrating object tracking according to embodiments of the present disclosure.

FIG. 2A is a drawing illustrating object position distortion according to camera motion according to embodiments of the present disclosure. FIG. 2B is a drawing illustrating object position correction according to embodiments of the present disclosure. FIG. 2C is a drawing illustrating object tracking according to embodiments of the present disclosure.

Referring to FIG. 2A, a camera 110 of FIG. 1 may capture and transmit a first image 210 to the processor 130 of FIG. 1 at time t−1. The processor 130 may detect a position of a first object 211 from the first image 210. Thereafter, in a state where motion of the camera 110 occurs, the camera 110 may capture and transmit a second image 220 at time t to the processor 130. The processor 130 may detect a position of a second object 221 from the second image 220. In this case, the position of the first object 211 may be the same as that of the second object 221 in the real world, but object positions in the image may be differently detected due to motion of the camera 110.

Referring to FIG. 2B, the processor 130 may correct the position of the first object 211, which is detected from the first image 210, using a homography matrix H. In other words, the processor 130 may obtain the position of the first object 211 on the second image 220 by means of position correction using the homography matrix.

Referring to FIG. 2C, the processor 130 may match the first object 211, the position of which is corrected, to the second object 221 of the second image 220. The processor 130 may estimate object motion using a change in position of the second object 221 based on the corrected position of the first object 211 to perform object tracking.

Figure 3A:
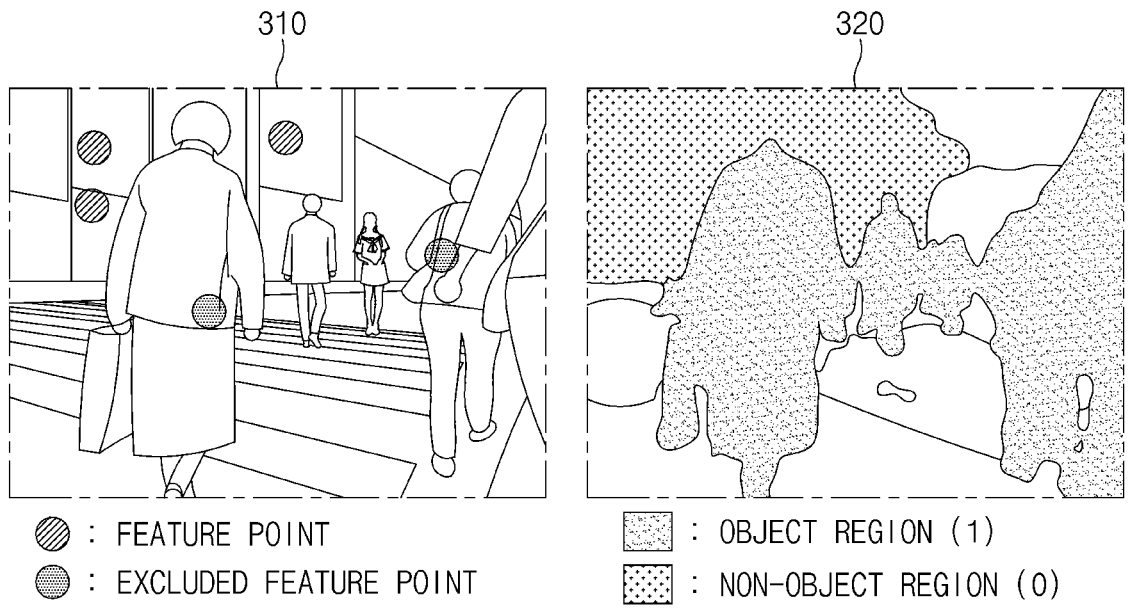
FIGS. 3A and 3B are drawings illustrating a homography derivation scheme based on feature point matching according to embodiments of the present disclosure.
Figure 3B:
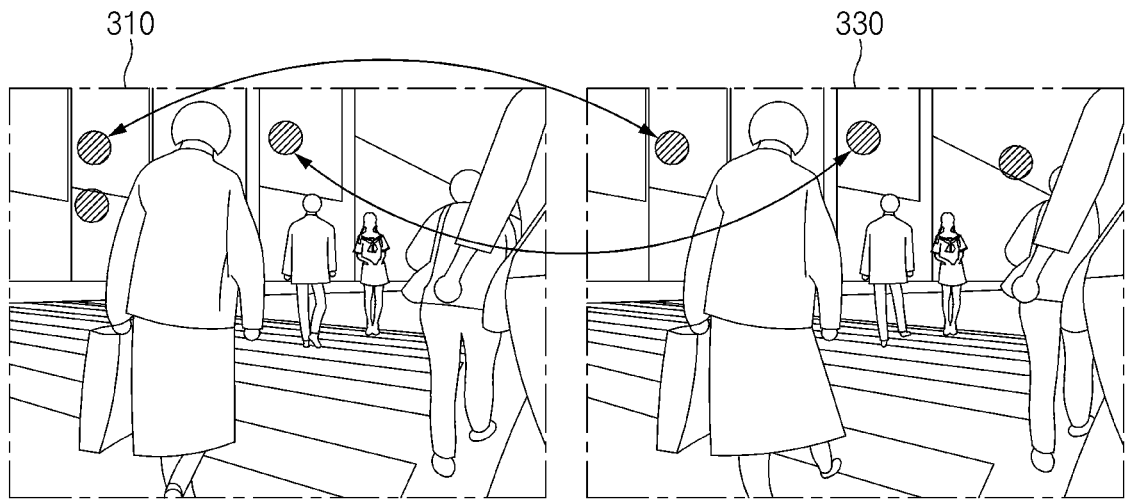

FIGS. 3A and 3B are drawings illustrating a homography derivation scheme based on feature point matching according to embodiments of the present disclosure.

First of all, the processor 130 of FIG. 1 may extract a feature point from a first image at time t. The processor 130 may extract a feature point using an algorithm such as oriented and rotated binary robust independent elementary feature (BRIEF) (ORB), scale invariant feature transform (SIFT), speeded up robust feature (SURF), a deep neural network (DNN), and/or the like. The feature point may include pixel coordinate information ($x_i$, $y_i$), feature information (e.g., a feature descriptor), and the like.

The processor 130 may perform semantic segmentation of the first image 310 to derive a second image 320, the object region of which is segmented. The processor 130 may perform semantic segmentation of a predefined object class. The predefined object class may be a moving object such as a pedestrian, a vehicle, and/or a train. In other words, the processor 130 may assign "1" to a predefined object region and may assign "0" to a non-object region to derive the second image 320. The processor 130 may recognize an object region in the image using semantic segmentation.

The processor 130 may filter a feature point in a segmentation region, that is, the recognized object region. The processor 130 may exclude a feature point located in the object region among the feature points extracted from the first image 310.

The processor 130 may match the filtered feature point with a feature point extracted from a third image 330 at time t−1. In other words, the processor 130 may match a feature point extracted from a non-object region of a current image with a feature point extracted from a non-object region of a previous image. An algorithm such as brute force, k-nearest neighbors (KNN), and/or fast library for approximate nearest neighbors (FLANN) may be used for feature point matching. The non-object region of the current image and the non-object region of the previous image may be at least partially overlapped with each other The processor 130 may derive a homography matrix H based on the matched feature point. In this case, the processor 130 may estimate homography using an algorithm such as random sample consensus (RANSAC), least square, least median, and/or progressive sample consensus (PROSAC). The processor 130 may randomly select four feature point pairs to derive the homography matrix H. The processor 130 may count the number of (i, j) which is $\|[x_i, y_i, 1]^T - H[x_j, y_j, 1]^T\|_2 < \tau$ and may return the homography matrix H when the counted number is highest. Herein, $\tau$ is a predefined constant value.

Like the present embodiment, because a homography derivation scheme based on feature point matching filters a feature point of a dynamic object region and derives a homography matrix using only a feature point of a static background region, the homography matrix may include camera motion information.

Figure 4:
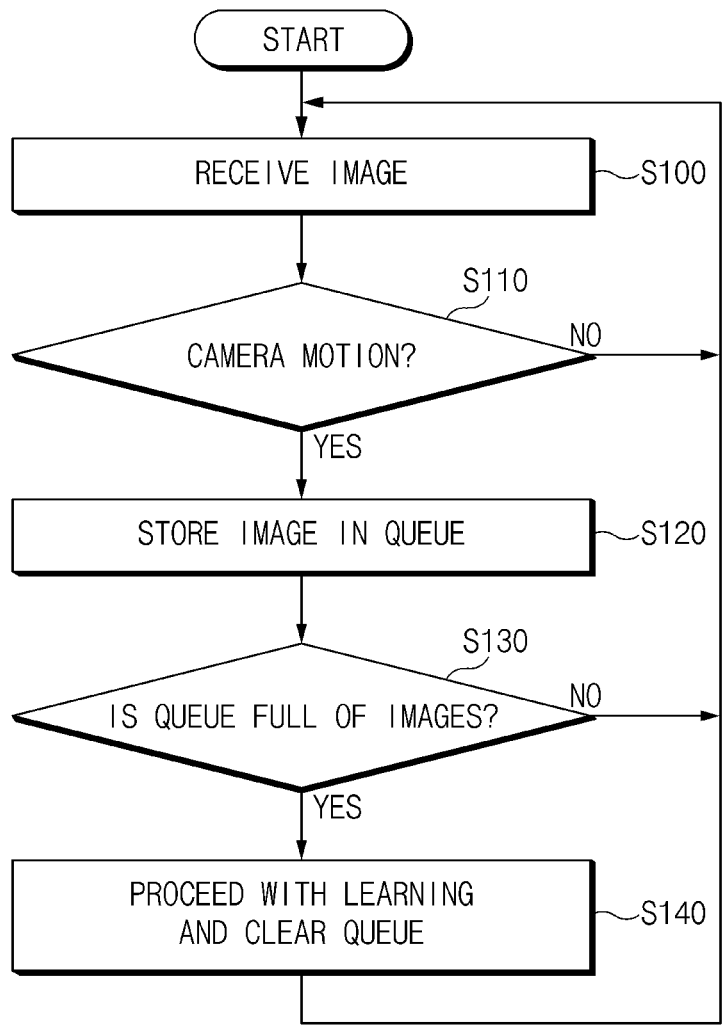
FIG. 4 is a flowchart illustrating a method for learning a homography derivation network according to embodiments of the present disclosure.
Figure 5A:
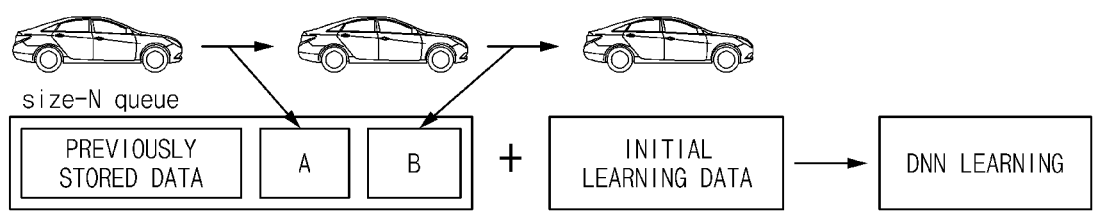
FIG. 5A is a drawing illustrating a method for learning a homography derivation network according to embodiments of the present disclosure.
Figure 5B:
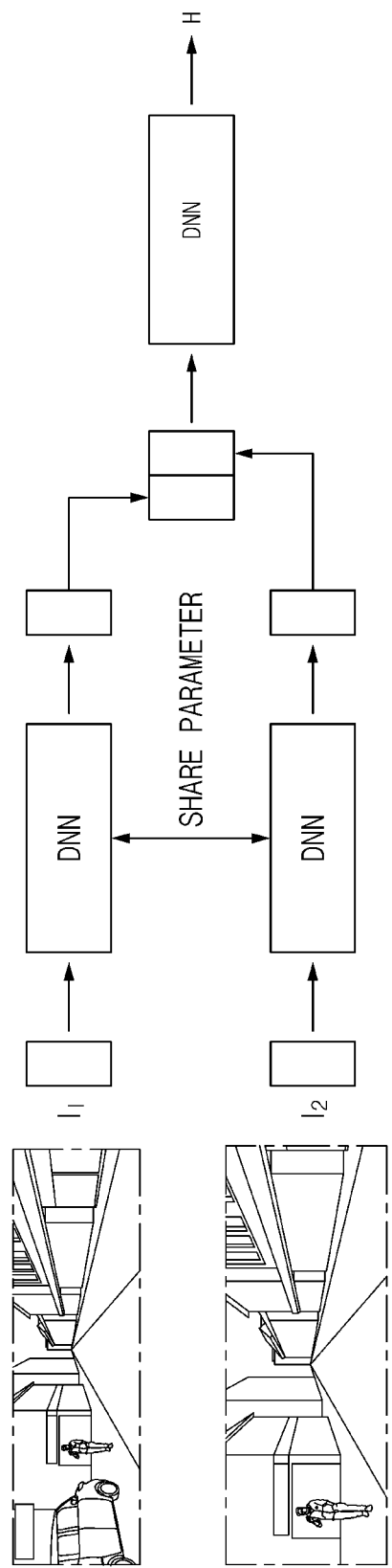
FIG. 5B is a drawing illustrating a homography derivation scheme based on deep learning according to embodiments of the present disclosure.

FIG. 4 is a flowchart illustrating a method for learning a homography derivation network according to embodiments of the present disclosure. FIG. 5A is a drawing illustrating a method for learning a homography derivation network according to embodiments of the present disclosure. FIG. 5B is a drawing illustrating a homography derivation scheme based on deep learning according to embodiments of the present disclosure.

The homography derivation scheme based on the deep learning may perform unsupervised learning for a homography derivation network using an independent learning scheme. Herein, a previously known homography derivation network may be used as the homography derivation network. The learning of the homography derivation network is always possible in a situation where there is camera motion. Furthermore, the learning of the homography derivation network may be executed in parallel with an object tracking method shown in FIG. 8, which will be described below, using a scheme such as multi-thread or multi-process.

In S100, a processor 130 of FIG. 1 may receive an image using the camera 110 of FIG. 1. The processor 130 may sample an image (a frame) at a random interval with regard to a frame rate and may extract an image pair, for example, a target image and a reference image. In this case, the target image and the reference image are different from each other. A probability of selecting the target image upon learning is greater than a probability of selecting the reference image. The processor 130 may randomly extract an interval between an image pair using Equation 1 below.

$$\text{interval} = \text{rand}\left(\max\left(1, \frac{f_v}{f_t} - \sigma\right), \max\left(1, \frac{f_v}{f_t} + \sigma\right)\right) \quad \text{Equation 1}$$

Herein, $f_t$ denotes the target frame rate and $f_v$ denotes the video frame rate. $\sigma$ is the noise constant value, which may be to extract an interval extraction range between frames. The processor 130 may randomly determine an interval between an image pair in the interval extraction range adjusted by $\sigma$.

In S110, the processor 130 may identify whether there is motion of the camera 110. As an example, the processor 130 may calculate and normalize a homography matrix from the sampled image pair. When a difference between the normalized homography matrix $H/h_9$ and an identity matrix is greater than or equal to a predetermined reference value, the processor 130 may determine that the camera 110 is moving. As another example, the processor 130 may receive motion information (e.g., "true" or "false") of a motor from a platform on which the camera 110 is mounted and may determine that the camera 110 is moving, when the received motion information is "true". As another example, the processor 130 may determine motion of the camera 110 by complexly using motion information of the motor and a homography matrix.

When there is motion of the camera 110, in S120, the processor 130 may store the received image in a queue. The queue may be limited in size. The queue may be provided in the memory 120 of FIG. 1.

In S130, the processor 130 may identify whether the queue is full of images.

When the queue is full of the images, in S140, the processor 130 may proceed with learning using the images stored in the queue and may clear the queue. Referring to FIG. 5A, the processor 130 may learn a homography derivation network using the images stored in the queue and initial learning data. When the learning is completed, the processor 130 may delete all the images stored in the queue.

When the queue is not full of images, the processor 130 may return to S100 to receive an image.

Referring to FIG. 5B, the processor 130 may derive a homography matrix using the learned homography derivation network. When receiving two different images $I_1$ and $I_2$, the processor 130 may derive a homography matrix H using the learned network. The learned homography derivation network may automatically remove an element which interferes with homography calculation.

Furthermore, when there is camera motion in a predetermined specific place, the processor 130 may learn a homography derivation network optimized for the place. The processor 130 may upwardly adjust a probability of selecting an image captured in a target place upon learning to optimize a homography derivation network for the place. When a movement space of the object tracking apparatus 100 is limited, the processor 130 may more accurately perform inference by performing overfitting to a background of the movement space.

Figure 6:
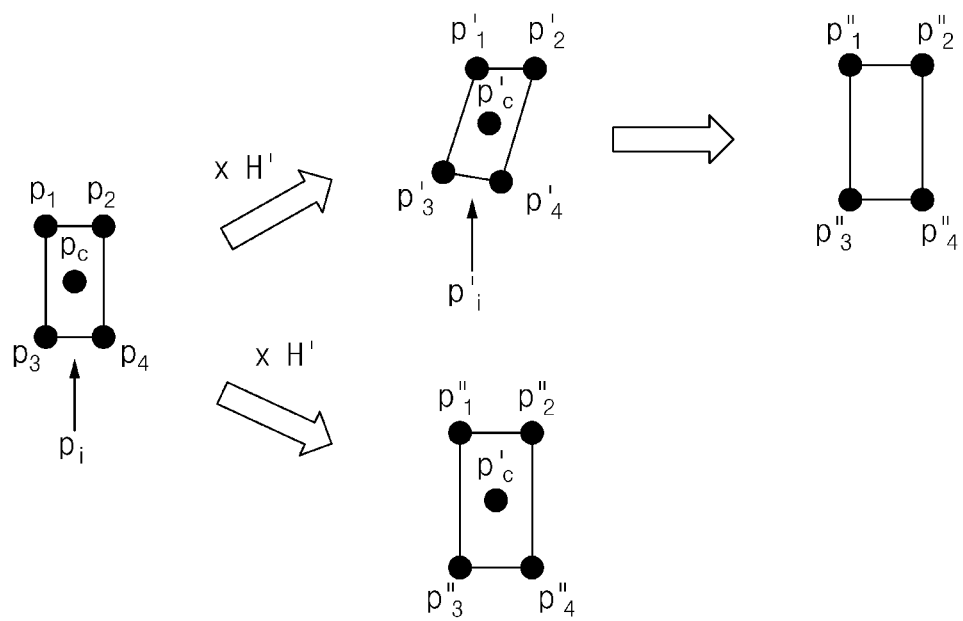
FIG. 6 is a drawing illustrating object state correction using homography according to embodiments of the present disclosure.

FIG. 6 is a drawing illustrating object state correction using homography according to embodiments of the present disclosure.

The processor 130 of FIG. 1 may derive a homography matrix H based on two scaled images. In this case, the processor 130 may derive a homography matrix $H'(=M^{-1}HM)$ in which size conversion of the image, that is, image scaling is considered. Herein, M may be the scaling matrix, which may be represented as $$\begin{bmatrix} s1 & 0 & 0 \\ 0 & s2 & 0 \\ 0 & 0 & 1 \end{bmatrix},$$

and s1 and s2 may be a horizontal magnification and a vertical magnification, respectively, which may be set in advance by a system designer.

The processor 130 may correct a bounding box (bbox) $p_i$ of an object which is being previously tracked using the derived homography matrix H'. In this case, the processor 130 may correct a position of the object using one of a method for performing correction using four vertices of bbox $p_i$ and a method for performing correction using only a center point of bbox $p_i$.

First of all, a description will be given of the method for performing the correction using the four vertices of bbox $p_i$. The processor 130 may correct bbox $p_i$ of an old object by applying the homography matrix H' in which the image scaling is considered to obtain the corrected bbox $p'_i$. Because the corrected bbox $p'_i$ is a 2D bbox, it may make a z component into "1". Because the corrected bbox $p'_i$ is not a box (quadrangle) shape, the processor 130 may correct the shape of the corrected bbox $p'_i$. The processor 130 may calculate a width $$w' = \frac{(\|p'_1 - p'_2\|_2 + \|p'_3 - p'_4\|_2)}{2}$$

and a height $$h' = \frac{(\|p'_1 - p'_3\|_2 + \|p'_2 - p'_4\|_2)}{2}$$

using coordinate information of four vertices of the corrected bbox $p'_i$. The processor 130 may obtain four vertices $p''_1 = p'_c + (-w'/2, -h'/2)$, $p''_2 = p'_c + (w'/2, -h'/2)$, $p''_3 = p'_c + (-w'/2, h'/2)$, and $p''_4 = p'_c + (w'/2, h'/2)$ of the finally corrected bbox $p''_i$ based on a center point $p'_c$ of the corrected bbox $p'_i$ and the calculated width w' and height h'.

Next, a description will be given of the method for performing the correction using only the center point of bbox $p_i$. The processor 130 may correct a center point $p_c$ of bbox $p_i$ of an old object by applying the homography matrix H' in which the image scaling is considered. The processor 130 may obtain four vertices $$p''_1 = p'_c + \left(-\frac{w}{2}, -\frac{h}{2}\right),$$

$$p''_2 = p'_c + \left(\frac{w}{2}, -\frac{h}{2}\right),$$

$$p''_1 = p'_c + \left(-\frac{w}{2}, \frac{h}{2}\right),$$

and $p''_1 = p'_c + \left(\frac{w}{2}, \frac{h}{2}\right)$ of the finally corrected bbox $p''_i$ based on the center point $p'_c$ of the corrected bbox $p'_i$ and a width w and a height h of bbox $p_i$ of the old object.

Figure 7:
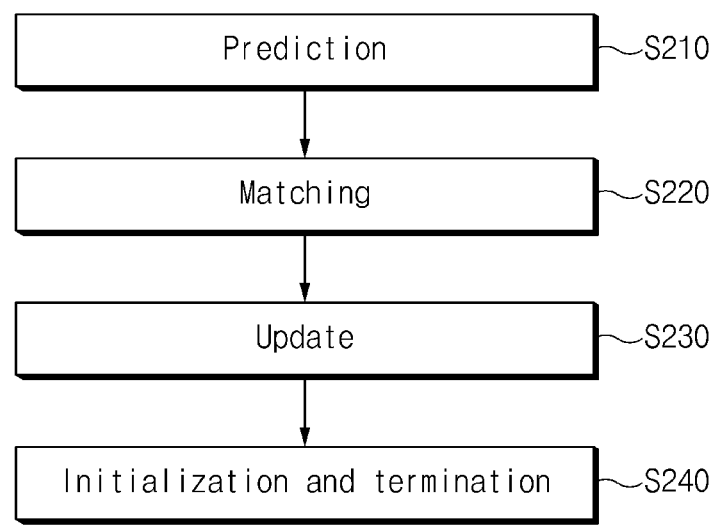
FIG. 7 is a flowchart illustrating an object tracking process according to embodiments of the present disclosure.

FIG. 7 is a flowchart illustrating an object tracking process according to embodiments of the present disclosure.

In the present embodiment, an example of using a Kalman filter will be described. The Kalman filter may represent a state of each object as mean and variance. The object tracking process using the Kalman filter may be implemented with a prediction step S210, a matching step S220, an update step S230, and an initialization and termination step S240.

In S210, the processor 130 of FIG. 1 may predict an object state (e.g., a position, a size, and the like) on a new frame based on motion information. In other words, the processor 130 may predict a state mean of the object at time t based on a measurement value at time t31 1. The processor 130 may predict (estimate) a state variance at time t based on a measurement value at time t−1.

In S220, the processor 130 may perform matching between the predicted object state and a state of an object being tracked. The processor 130 may calculate intersection over union (IoU) or Euclidean distance between the detected objects (bbox) and objects being tracked and may perform matching between two objects using a Hungarian algorithm or a greedy algorithm based on the calculated value.

In S230, the processor 130 may calculate a difference between the predicted object state and the matched object state. The processor 130 may reflect the calculated difference and a Kalman gain in the predicted state mean at time t to update the state mean at time t. Furthermore, the processor 130 may update the state variance at time t.

In S240, when the matched object is not found, the processor 130 may initialize the detected object to a new object and may end tracking of the object being tracked.

Figure 8:
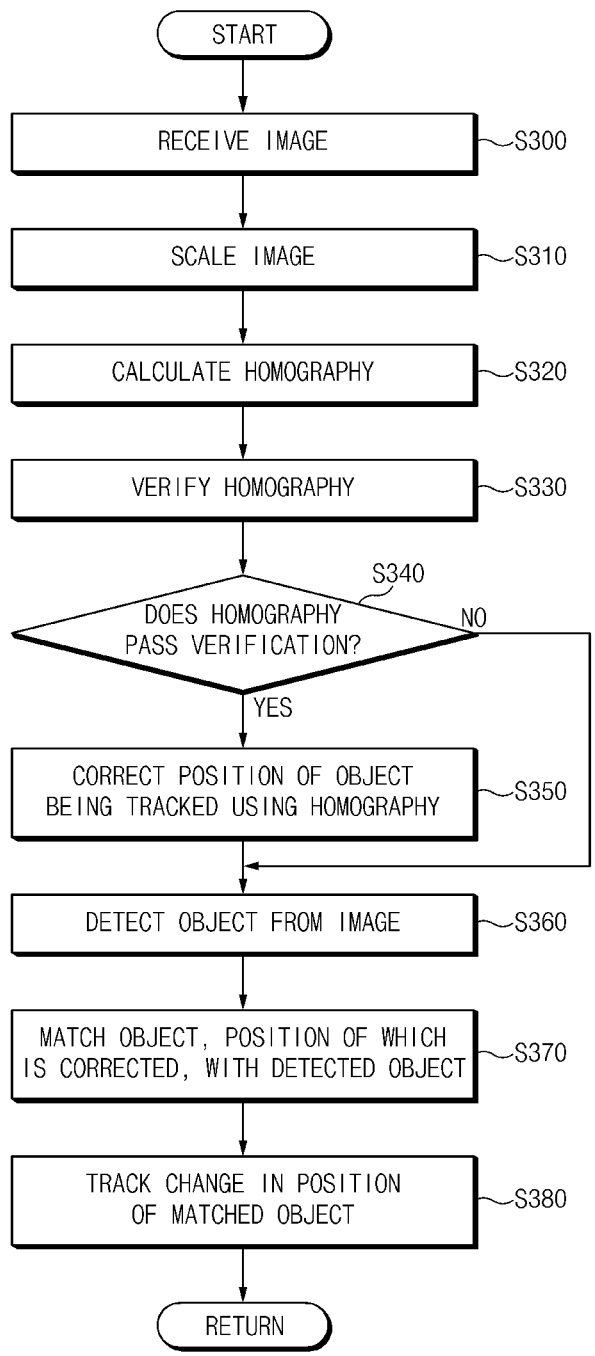
FIG. 8 is a flowchart illustrating an object tracking method according to embodiments of the present disclosure.

FIG. 8 is a flowchart illustrating an object tracking method according to embodiments of the present disclosure.

Referring to FIG. 8, in S300, the processor 130 of FIG. 1 may receive a first image at time t from the camera 110 of FIG. 1. The processor 130 may receive an RGB image from the camera 110.

In S310, the processor 130 may scale the first image based on a predetermined magnification. The processor 130 may scale (reduce) an original image $I_t$ received from the camera 110 at the predetermined magnification. As an example, the processor 130 may scale the original image $I_t$ with resolution of 1920×1080 to an image $I'_t$ of 640×480 to speed up a calculation speed.

In S320, the processor 130 may calculate homography using the scaled first image and a second image at time t−1. The second image may be an image scaled based on the predetermined magnification. The processor 130 may derive a homography matrix H using at least one of a homography derivation scheme based on feature point matching (a first homography derivation scheme) or a homography derivation scheme based on deep learning (a second homography derivation scheme). As an example, the processor 130 may calculate a homography matrix from a current image and a previous image using the homography derivation scheme which is previously selected by a user. As another example, the processor 130 may calculate each of a first homography matrix and a second homography matrix using the homography derivation scheme based on the feature point matching and the homography derivation based on the deep learning. Thereafter, the processor 130 may pass through a homography verification process to select a homography matrix with a higher target detection matching rate between the first homography matrix and the second homography matrix.

In S330, the processor 130 may verify the calculated homography based on a predetermined verification condition. When the homography matrix $$H = \begin{bmatrix} h_1 & h_2 & h_3 \\ h_4 & h_5 & h_6 \\ h_7 & h_8 & h_9 \end{bmatrix}$$

corresponds to at least one of predetermined verification conditions $\sqrt{h_1^2+h_4^2}>\tau_{xmax}$, $\sqrt{h_2^2+h_5^2}>\tau_{ymax}$, $\sqrt{h_1^2+h_4^2}\leq\tau_{xmin}$, $\sqrt{h_2^2+h_5^2}\leq\tau_{ymin}$, $h_1h_5-h_2h_4\leq0$, and $\sqrt{h_7^2+h_8^2}>\tau_{pers}$, the processor 130 may determine that the homography matrix $$H = \begin{bmatrix} h_1 & h_2 & h_3 \\ h_4 & h_5 & h_6 \\ h_7 & h_8 & h_9 \end{bmatrix}$$

does not pass verification. When the homography matrix H does not correspond to one of the predetermined verification conditions $\sqrt{h_1^2+h_4^2}>\tau_{xmax}$, $\sqrt{h_2^2+h_5^2}>\tau_{ymax}$, $\sqrt{h_1^2+h_4^2}\leq\tau_{xmin}$, $\sqrt{h_2^2+h_5^2}\leq\tau_{ymin}$, $h_1h_5-h_2h_4\leq0$, and $\sqrt{h_7^2+h_8^2}>\tau_{pers}$, the processor 130 may determine that the homography matrix H passes the verification.

In S340, the processor 130 may identify whether the homography passes verification.

In S350, the processor 130 may correct a position of an object being tracked using the homography which passes the verification. The processor 130 may correct a position of an object (a first object) detected from a second image, that is, the object being tracked, using the homography matrix which passes verification. In other words, the processor 130 may predict a state of an object at time t based on the result of tracking the object at time t−1 and may correct the predicted state of the object using the homography matrix.

In S360, the processor 130 may detect an object (a second object) from the first image. The processor 130 may also detect the object from the first image, when the homography does not pass the verification in S340.

In S370, the processor 130 may match the object detected from the first image with the object, the position of which is corrected. The processor 130 may search for the second object matched with the first object being tracked from the first image.

In S380, the processor 130 may track a change in position of the matched object. The processor 130 may track the matched second object based on the corrected position of the first object being tracked. In this case, the processor 130 may track an object using a Kalman filter-based tracker.

In the above-mentioned embodiment, the description is given of the example of predicting the state of the object being tracked according to motion of the camera 110 and correcting the predicted object state using the Kalman filter or the linear motion algorithm, but the present disclosure is not limited thereto. It may be implemented to correct an object state using the Kalman filter or the linear motion algorithm before predicting the state of the object being tracked according to the motion of the camera 110. Furthermore, it may be implemented to correct an object state using a simple IoU matching algorithm without predicting the state of the object being tracked according to the motion of the camera 110.

Figure 9:
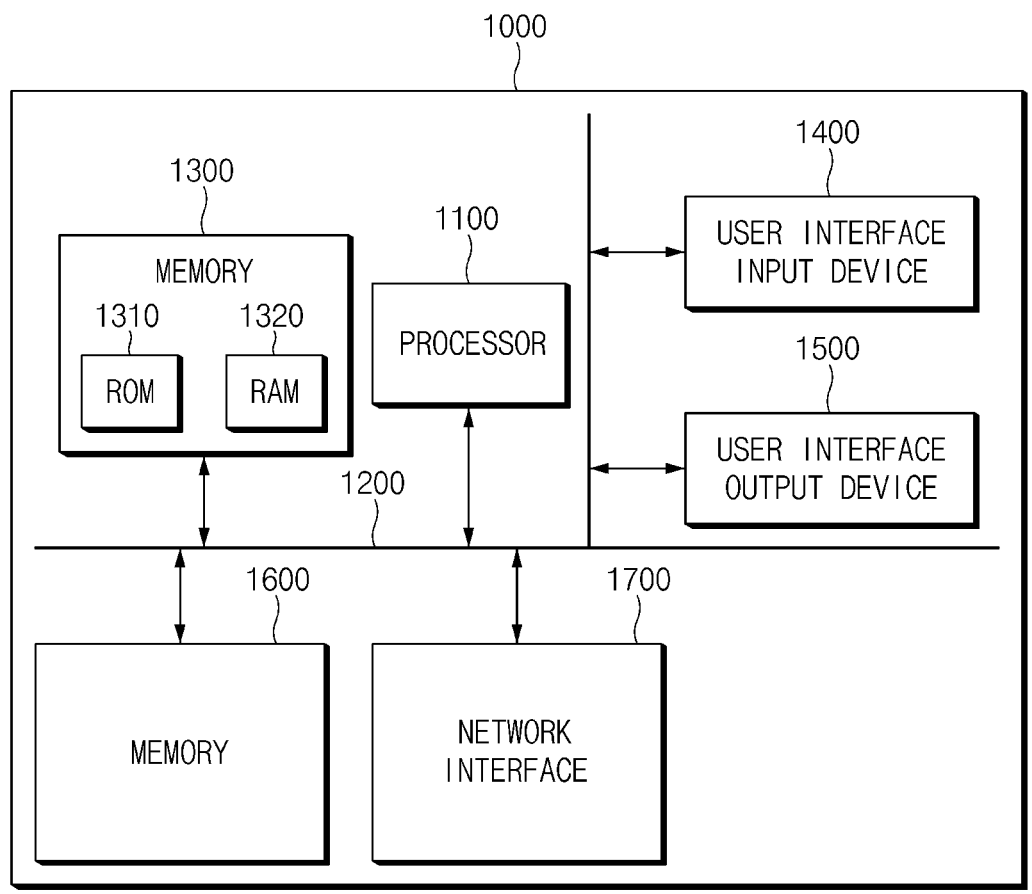
FIG. 9 is a block diagram illustrating a computing system for executing an object tracking method according to embodiments of the present disclosure.

FIG. 9 is a block diagram illustrating a computing system for executing an object tracking method according to embodiments of the present disclosure.

Referring to FIG. 9, a computing system woo may include at least one processor 1100, a memory 1300, a user interface input device 1400, a user interface output device 1500, a memory (i.e., storage) 1600, and a network interface 1700, which are connected with each other via a bus 1200.

The processor 1100 may be a central processing unit (CPU) or a semiconductor device that processes instructions stored in the memory 1300 and/or the memory 1600. The memory 1300 and the memory 1600 may include various types of volatile or non-volatile storage media. For example, the memory 1300 may include a read only memory (ROM) 1310 and a random access memory (RAM) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the memory 1600) such as a RAM, a flash memory, a ROM, an EPROM, an EEPROM, a register, a hard disk, a removable disk, and a CD-ROM. The exemplary storage medium may be coupled to the processor 1100. The processor 1100 may read out information from the storage medium and may write information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

According to embodiments of the present disclosure, the object tracking apparatus may correct a position of an object by offsetting camera motion using only an RGB image.

Furthermore, according to embodiments of the present disclosure, the object tracking apparatus may simplify a system configuration because of not using separate sensor information and may be free from sensor synchronization problems.

Furthermore, according to embodiments of the present disclosure, the object tracking apparatus may estimate linear movement on a three-dimensional (3D) space using only an image.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, embodiments of the present invention are not intended to limit the technical spirit of the present invention, but provided only for the illustrative purpose. The scope of the present disclosure should be construed on the basis of the accompanying claims, and all the technical ideas within the scope equivalent to the claims should be included in the scope of the present disclosure.

What is claimed is:

1. An object tracking method comprising:
receiving a first image at time t from a camera;
deriving a homography matrix based on the first image and a second image from time t−1;
correcting a position of a first object detected from the second image using the homography matrix;
detecting a second object matched with the first object from the first image; and
tracking a change in position of the second object based on the corrected position of the first object;
wherein deriving the homography matrix comprises:
deriving a first homography matrix and a second homography matrix using a first homography derivation scheme and a second homography derivation scheme; and
selecting the homography matrix with a higher target detection matching rate from among the first homography matrix and the second homography matrix.

2. The object tracking method of claim 1, wherein deriving the homography matrix comprises deriving the homography matrix using a first homography derivation scheme or a second homography derivation scheme.

3. The object tracking method of claim 1, wherein the first homography derivation scheme comprises a method for deriving the homography matrix based on matching of a feature point of a static object except for a feature point of a dynamic object.

4. The object tracking method of claim 1, wherein the second homography derivation scheme comprises a method for deriving the homography matrix using a homography derivation network based on unsupervised learning.

5. An object tracking method comprising:
receiving a first image at time t from a camera;
deriving a homography matrix based on the first image and a second image from time t−1, wherein deriving the homography matrix further comprises verifying the homography matrix based on a predetermined verification condition;
correcting a position of a first object detected from the second image using the homography matrix;
detecting a second object matched with the first object from the first image; and
tracking a change in position of the second object based on the corrected position of the first object.

6. The object tracking method of claim 5, wherein verifying the homography matrix comprises:
determining that a verification passes in a case in which the homography matrix $$H = \begin{bmatrix} h_1 & h_2 & h_3 \\ h_4 & h_5 & h_6 \\ h_7 & h_8 & h_9 \end{bmatrix}$$

does not meet the predetermined verification condition; and
determining that the verification does not pass in a case in which the homography matrix $$H = \begin{bmatrix} h_1 & h_2 & h_3 \\ h_4 & h_5 & h_6 \\ h_7 & h_8 & h_9 \end{bmatrix}$$

meets the predetermined verification condition.

7. The object tracking method of claim 1, further comprising learning a homography derivation network based on images sampled in a situation where the camera is moving and initial learning data.

8. The object tracking method of claim 1, wherein receiving the first image comprises scaling the first image at a predetermined magnification.

9. The object tracking method of claim 8, wherein deriving the homography matrix comprises deriving the homography matrix with regard to the scaling.

10. An object tracking apparatus comprising:
a camera; and
a processor connected with the camera, wherein the processor is configured to:
receive a first image at time t from the camera;
derives a homography matrix based on the first image and a second image from time t−1;
correct a position of a first object detected from the second image using the homography matrix;
detect a second object matched with the first object from the first image; and
track a change in position of the second object based on the corrected position of the first object;
wherein the processor is configured to:
derive a first homography matrix and a second homography matrix using a first homography derivation scheme and a second homography derivation scheme; and
select the homography matrix with a higher target detection matching rate from among the first homography matrix and the second homography matrix.

11. The object tracking apparatus of claim 10, wherein the processor is configured to derive the homography matrix using a first homography derivation scheme or a second homography derivation scheme.

12. The object tracking apparatus of claim 10, wherein the first homography derivation scheme comprises a method for deriving the homography matrix based on matching of a feature point of a static object except for a feature point of a dynamic object.

13. The object tracking apparatus of claim 10, wherein the second homography derivation scheme comprises a method for deriving the homography matrix using a homography derivation network based on unsupervised learning.

14. The object tracking apparatus of claim 10, wherein the processor is configured to verify the homography matrix based on a predetermined verification condition.

15. The object tracking apparatus of claim 14, wherein the processor is configured to:

determine that a verification passes in a case in which the homography matrix $$H = \begin{bmatrix} h_1 & h_2 & h_3 \\ h_4 & h_5 & h_6 \\ h_7 & h_8 & h_9 \end{bmatrix}$$

does not meet the predetermined verification condition; and
determine that the verification does not pass in a case in which the homography matrix $$H = \begin{bmatrix} h_1 & h_2 & h_3 \\ h_4 & h_5 & h_6 \\ h_7 & h_8 & h_9 \end{bmatrix}$$

meets the predetermined verification condition.

16. The object tracking apparatus of claim 10, wherein the processor is configured to learn a homography derivation network based on images sampled in a situation where the camera is moving and initial learning data.

17. The object tracking apparatus of claim 10, wherein the processor is configured to scale an image obtained by the camera at a predetermined magnification.

18. The object tracking apparatus of claim 17, wherein the processor is configured to derive the homography matrix with regard to the scaling.

19. The object tracking method of claim 5, further comprising learning a homography derivation network based on images sampled in a situation where the camera is moving and initial learning data.

20. The object tracking method of claim 5, wherein receiving the first image comprises scaling the first image at a predetermined magnification.

\* \* \* \* \*